United States Patent [19]

Grad

[11] Patent Number: 5,794,125
[45] Date of Patent: Aug. 11, 1998

[54] TRANSMITTER BATTERY LIKE INDICATION APPARATUS AND METHOD

[75] Inventor: Steven M. Grad, Deerfield, Ill.

[73] Assignee: Shure Brothers Incorporated, Evanston, Ill.

[21] Appl. No.: 632,677

[22] Filed: Apr. 16, 1996

[51] Int. Cl.⁶ .................. H04Q 3/02; H04B 1/16
[52] U.S. Cl. .................. 455/38.3; 455/343
[58] Field of Search .................. 455/38.3, 38.4, 455/67.1, 67.4, 67.7, 89, 115, 218, 343, 450; 364/710.12; 320/48; 340/636; 379/390, 421

[56] References Cited

U.S. PATENT DOCUMENTS

| | | | |
|---|---|---|---|
| 3,569,816 | 3/1971 | Marzolf | 331/47 |
| 4,012,597 | 3/1977 | Lynk, Jr. et al. | 455/450 |
| 5,130,633 | 7/1992 | Maruichi | 340/636 |
| 5,142,563 | 8/1992 | Nyuu et al. | 455/343 |
| 5,565,782 | 10/1996 | Sato | 364/710.12 |
| 5,568,448 | 10/1996 | Tanigushi et al. | 367/82 |

FOREIGN PATENT DOCUMENTS 3-238933  10/1991  Japan .................. 455/67.1

Primary Examiner—Reinhard J. Eisenzopf
Assistant Examiner—Sam Bhattacharya
Attorney, Agent, or Firm—Banner & Witcoff Ltd

[57] ABSTRACT

A method and apparatus for determining the status of a battery that powers a wireless microphone transmitter. The transmitter has a tone oscillator that produces a tone of a frequency beyond the audible limit which is transmitted, along with acoustical signals, to a receiver. The amplitude of the tone is changed as the battery voltage of the transmitter decreases. The receiver for the transmitter includes a circuit that detects the changes in amplitude of the high frequency tone. The front panel of the receiver, for example, may contain an LCD display on which a battery fuel gauge is present, indicating the remaining battery life of transmitter. When an amplitude change beyond a threshold is detected, the fuel gauge is updated, and the respective bar on the gauge is turned off.

15 Claims, 5 Drawing Sheets

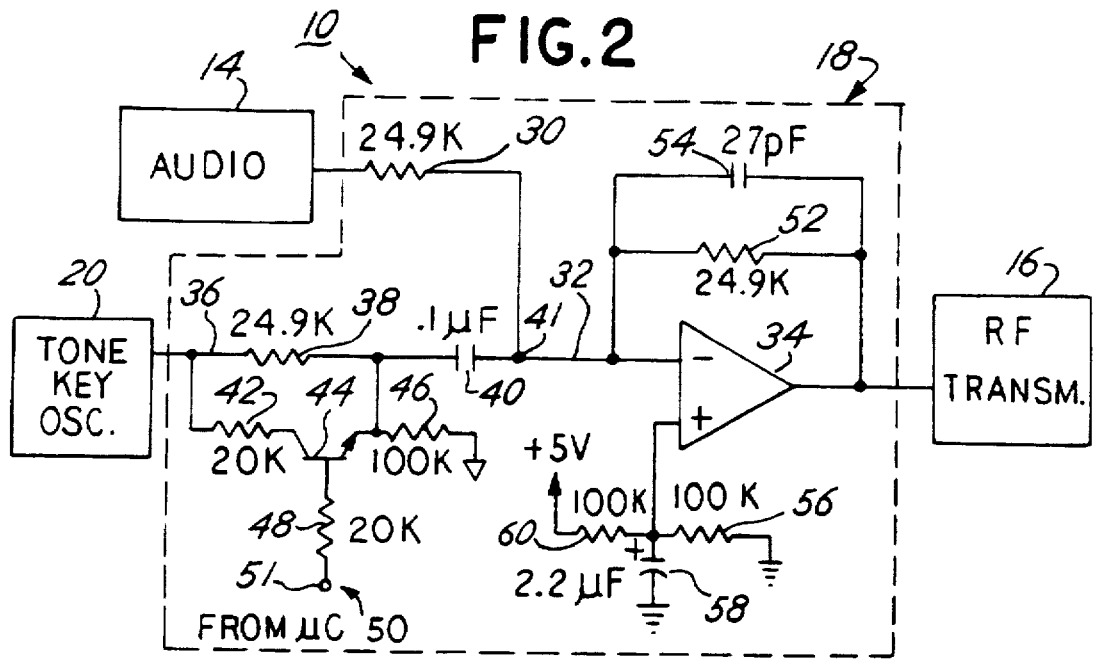
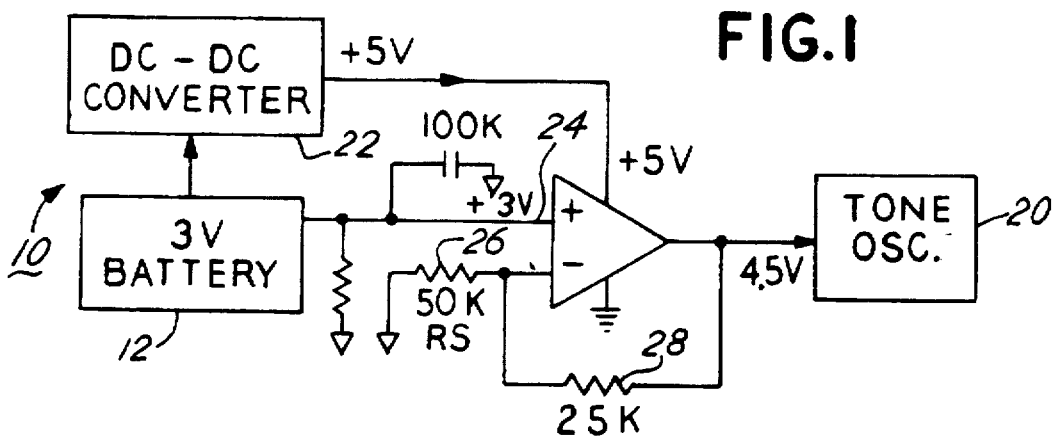
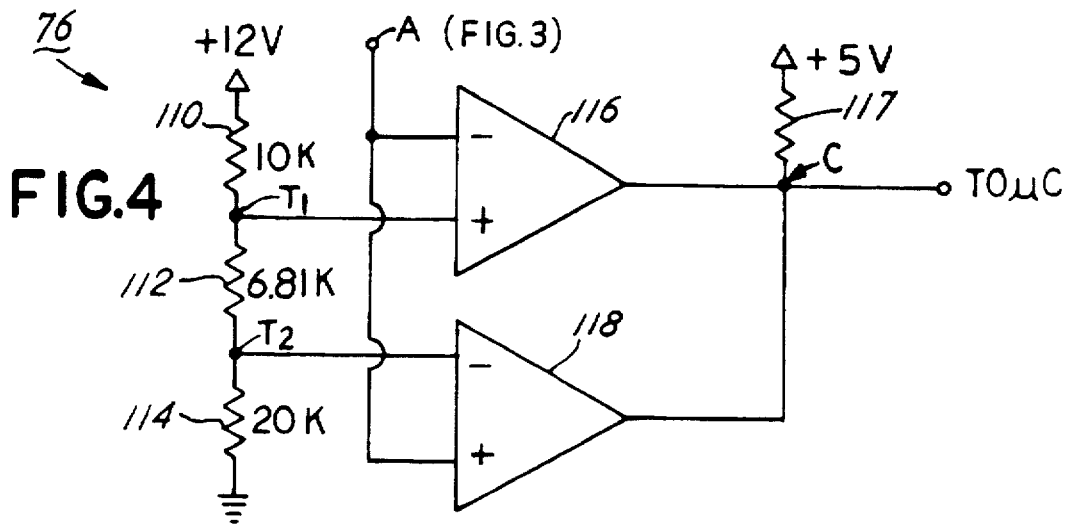

TRANSMITTER BATTERY LIKE INDICATION APPARATUS AND METHOD

BACKGROUND OF THE INVENTION

A. Field of the Invention

This invention relates to the field of wireless microphone systems having a battery-operated transmitter and a receiver.

B. Description of Related Art

In the art of wireless microphones, a microphone transmitter is positioned at a location to receive acoustic waves from a desired sound source and responsively transmit the acoustic information to a receiver via high frequency radio signals. Often, such transmitters are powered by a replaceable batteries, such as a 9 volt battery or two "AA" batteries.

Many modern wireless microphones incorporate a circuit that generates a tone having a frequency above the audible limit. This tone is used for what is known in the art as "tone coded squelch" or "tone key". When this feature is implemented, the receiver searches for the high frequency tone with suitable tone detection circuitry, and will not unsquelch the receiver until the tone is detected. In essence, the receiver is in an "OFF" condition until it detects the presence of the high frequency tone (indicating that the transmitter is active and transmitting acoustic information), whereupon the receiver is switched into an "ON" condition.

The tone may, for example, be a 32.768 Khz (or 32768 HZ) sine wave that is crystal-controlled by a standard 32.768 Khz watch crystal. The present invention takes advantage of the existing 32.768 KHz tone generated by the transmitter, and uses it to provide a means in the receiver for indicating the status of the battery in the transmitter. Using the techniques of the present invention, the battery level of the transmitter may be monitored such that a low battery indicator is activated at the receiver if the transmitter battery voltage falls to a predetermined threshold level. Alternatively, the invention provides for the implementation of a battery "fuel gauge", providing essentially a continued monitoring of the battery voltage as it lowers toward a level requiring battery replacement. This feature permits the user of the system to monitor the transmitter battery's life and schedule a battery replacement for a convenient time, and avoid a battery failure from occurring unexpectedly at a critical moment. These and other advantages and features of the invention will become apparent from the following detailed description of preferred and alternative embodiments of the invention.

SUMMARY OF THE INVENTION

The present invention is implemented in a system comprising a transmitter (such as a wireless microphone transmitter) having a battery, and a receiver. A method is provided for determining the status of said battery, comprising the steps of:

(a) transmitting a tone with the transmitter to the receiver, the tone having a first amplitude associated with the battery being in a normal or good condition;

(b) changing the amplitude of the tone from the first amplitude to a second amplitude when the condition of the battery changes from a normal condition to a low battery condition;

(c) receiving said tone with the receiver;

(d) detecting said change in amplitude of the tone associated with the low battery condition; and (e) responsively alerting a user of said system of the low battery condition of said battery when the amplitude of the tone changes.

Preferably, the step of changing the amplitude comprises the step of lowering the amplitude of the tone. The tone is typically generated by a tone oscillator, and the step of changing the amplitude of said tone preferably comprises the step of changing the amplitude of the output signal from the tone oscillator, such as by switching in or out a resistor to thereby lower the voltage of the output signal from the tone oscillator, or by decreasing the voltage level which the oscillator is operating from.

In a microphone application, the tone generated by the tone oscillator comprises a sine wave having a frequency above the audible limit of a human, for example, a 32.768 Khz sine wave produced by a clock crystal oscillator that is used to unsquelch the receiver. Thus, the invention may take advantage of existing tone generation circuitry in the transmitter and use the tone to indicate the status of the transmitter battery in the receiver.

BRIEF DESCRIPTION OF THE DRAWINGS

The presently preferred embodiment of the invention will be described in conjunction with the accompanying drawings, wherein like reference numerals refer to like elements in the various views, and wherein FIG. 1 is an overall block diagram of the transmitter battery and tone oscillator circuitry according to a preferred embodiment of the invention;

FIG. 2 is a circuit diagram of a portion of the transmitter of FIG. 1 with an alternate method for changing the tone key amplitude;

FIG. 4 is a circuit diagram of the alternate low battery detection circuitry of FIG. 3;

DESCRIPTION OF THE PREFERRED AND ALTERNATIVE EMBODIMENTS OF THE INVENTION

Figure 3:
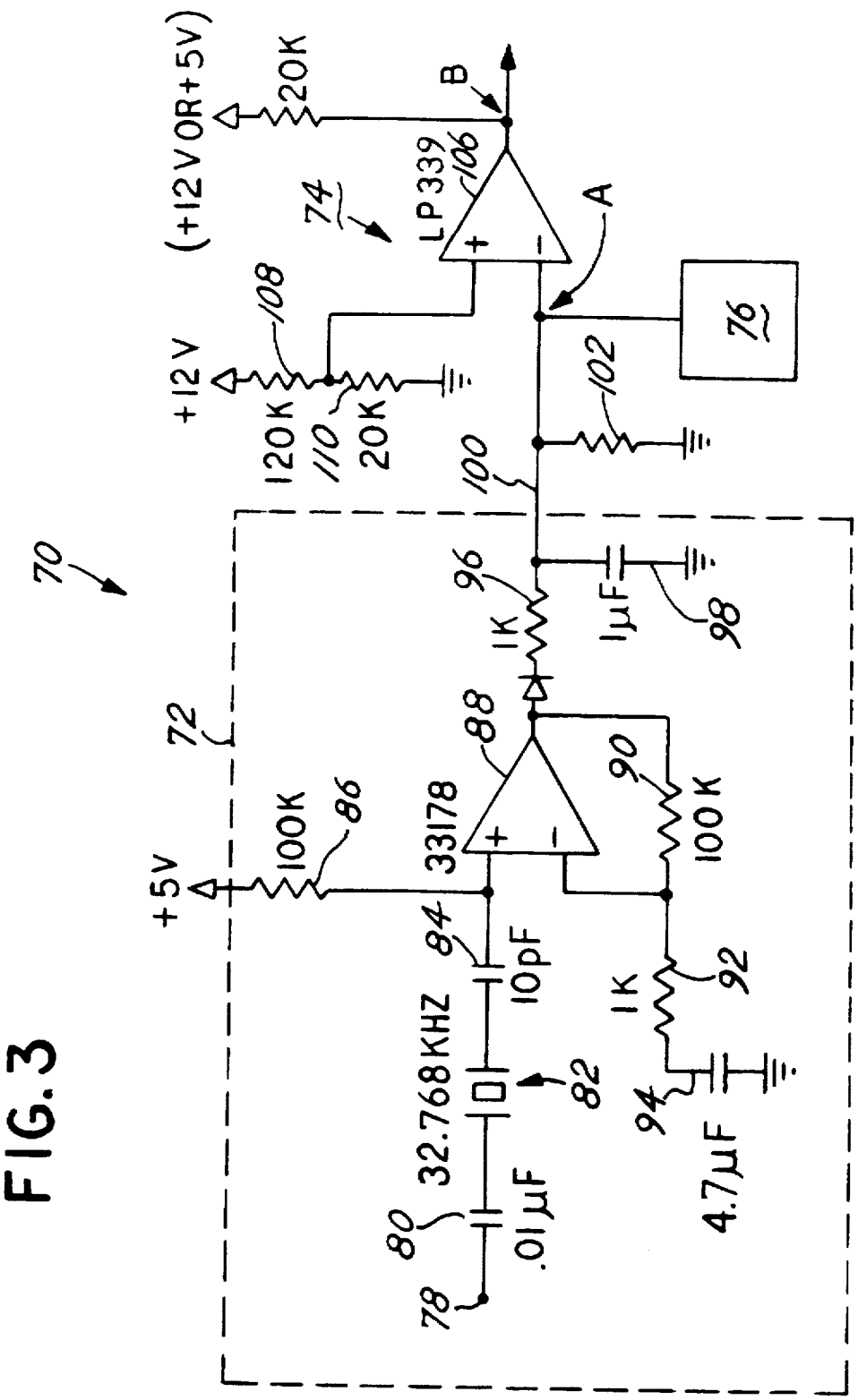
FIG. 3 is a circuit diagram of the tone detection circuitry of the receiver.

Referring now to FIG. 1 and FIG. 2, the transmitter 10 is shown in block diagram form. The transmitter 10 includes a battery 12, an audio circuit 14, a radio frequency (RF) transmitter 16, a summing amplifier 34, and a tone oscillator 20. The transmitter battery 12 may be, for example, a 9 volt replaceable or 2 "AA" batteries. A DC—DC converter 22 steps up the battery voltage from 3 volts to a constant 5 volts, which is supplied to an amplifier 24. The battery 12 is also connected to the positive terminal of amplifier 24. Resistor 26 connects to the negative terminal of the amplifier 24 and ground. A feedback resistor 28 is placed across the negative terminal of the amplifier and the amplifier output, resulting in an amplifier gain of 1½, thereby producing a 4.5 volt supply to the tone oscillator 20, for a 3V battery voltage.

Thus, it can be seen from FIG. 1 that in a preferred embodiment of the invention the tone oscillator 20 is run off the voltage from battery 12, which automatically causes a gradual lowering of the amplitude of the 32.768 Khz tone signal produced by the tone oscillator 20 as the supply voltage from battery 12 lowers with time. This will allow for more levels of battery status indication in the microphone receiver. Further, the stepping up of the battery voltage from 3 volts to 4.5 volts essentially magnifies or increases the "dynamic range" of the battery voltage status indication in the microphone receiver. It will be understood, however, that if a higher voltage battery is used, e.g. 9 volts, the stepping of voltage may not be needed, and in fact a step down to 4.5 volts could be used. Furthermore, the invention may be implemented by reducing the amplitude in alternate ways, as will be apparent from FIG. 2 and FIG. 8 and the following discussion.

When the oscillator 20 is supplied by the battery 12 via the dc amplifier, as the voltage level of the battery 12 goes down, so does the 4.5 volt supply to the tone oscillator 20, while the 5 volts supplied to the amplifier 24 stays the same. Amplifying the 3 volts up to 4.5 volts insures that the oscillator 20 will start up at low battery conditions. For example, if the battery 12 voltage falls to 2 volts, 3 volts are supplied to tone oscillator 20, which is enough for the tone oscillator 20 to operate.

Figure 8:
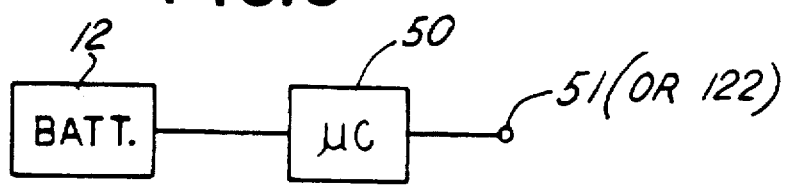
FIG. 8 is a block diagram of the battery and microcontroller for the embodiments of FIG. 2, FIG. 6 and FIG. 7.

Referring now to FIG. 2 and FIG. 8, alternate amplitude reduction methods will be described in greater detail. The audio circuit 14 is responsive to voice or other sounds and sends an output audio signal through resistor 30 onto an input conductor 32 to a summing amplifier 34. The output of the tone oscillator 20 is a 32.768 kHz sine wave of a given first amplitude. In a preferred mode, if the tone oscillator 20 is powered by the battery 12 via the dc amplifier, this amplitude will gradually lower with time as noted above. The tone from tone oscillator 20 is placed on conductor 36. A resistor 38 and capacitor 40 are placed in series between conductor 36 and conductor 32. In an alternate mode, a resistor 42 and transistor 44 are placed in parallel with resistor 38. A microcontroller 50 is connected to the base of transistor 44 via node 51 and resistor 48. The audio and 32.768 KHz tone are added together at summing node 41. A resistor 46 is placed between the emitter of transistor 44 and ground. The summing amplifier 34 includes a feedback circuit comprising resistor 52 and capacitor 54 in parallel. Resistors 60 and 56 and capacitor 58 are connected between positive terminal of summing amplifier 34 and ground, and supply a half supply bias for the amp stage. The output voltage of summing amplifier 34 is supplied to a conventional RF transmitter 16 (FM modulation) where the combined audio and tone key signal are transmitted to the receiver.

As shown in FIG. 8, the microcontroller 50 (such as Part No. MC68HC705LS from Motorola) is connected to the battery 12. When the battery 12 is substantially fully charged (i.e. "good"), the output signal from the microcontroller 50 at node 51 is a logic high (i.e., 5 volts). When the battery voltage drops below a threshold level, the microcontroller 50 sends a logic low signal to node 51. When a high signal is provided at node 51, the transistor is in an "ON" condition, causing current to flow through resistor 42. Due to the parallel current path through resistors 38 and 42 when the battery is in a good or normal condition, the amplitude of the oscillator that is transmitted is relatively high due to the higher gain in the summing amplifier 34. But when the transistor 44 is off, as in the case when the battery level falls below a threshold level and a logic low signal is input to the base of the transistor 44, resistor 42 is switched out of the circuit, causing the transmitted amplitude of the tone from the tone oscillator 20 to drop appreciably due to the reduction in gain of amplifier 34. When this change in amplitude is detected at the receiver, an indicator may be activated indicating a low battery condition in the transmitter.

In the event that a microcontroller 50 changes the signal level at node 51 too quickly, an audible "pop" may be induced into the RF transmitter's signal. This may be fixed by adding a capacitor that would slow down the turning "ON" and "OFF" of the transistor 44. For example, a capacitor could be added from the base of transistor 44 to ground.

Figure 10:
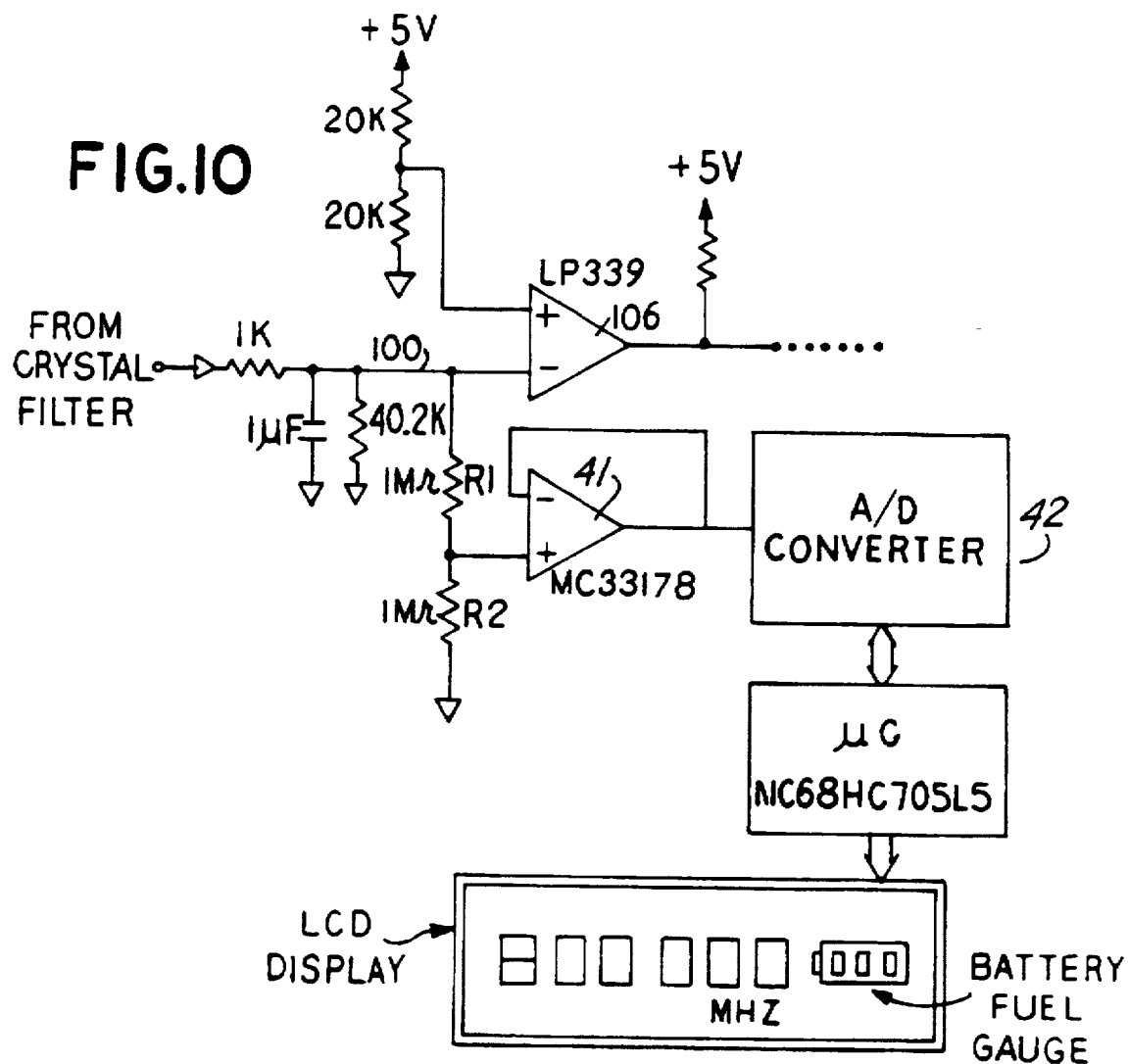
FIG. 10 is a block diagram of the preferred low battery detection/fuel gauge display circuitry of the receiver.

Referring now to FIG. 3 and FIG. 10, the pertinent portions of the receiver for the microphone transmitter 10 are shown in detail. The receiver includes a tone detection circuit 70, shown in circuit diagram form. The tone detection circuit 70 consists of an op-amp crystal filter circuit 72 (with the same clock crystal as was used in the tone oscillator 20), and a peak detect and comparator circuit 74. A low-battery detector circuit is also provided and is shown in block diagram form in FIG. 10.

The crystal filter circuit 72 receives demodulated voltage signals from a conventional FM receiver circuit (not shown) at point 78, where the signal passed through capacitor 80, clock crystal 82, capacitor 84 and into amplifier 88. A resistor 86 is placed between a 5 volt power supply and the positive input terminal of amp 88 for bias. Feedback resistor 90 is placed between the output of amp 88 and the negative terminal of amp 88. Resistor 92 and capacitor 94 are placed between the negative terminal and ground. The output of amp 96 is fed through a diode, to a low pass filter comprised of resistor 96 and capacitor 98.

The peak detect/comparator circuit 74 receives the output signals from amplifier 88 on conductor 100, where they are fed past resistor 102. Resistor 102 sets the capacitor discharge time constant. The point A at the input terminal to comparator 106 is the point of interest for low battery detection, as discussed below. Resistors 108 and 110 provide a reference voltage at the positive terminal of comparator 106 as shown. The output signal of comparator 106 point B is low when the 32.768 KHZ is present (i.e., the transmitter's oscillator is active and the tones are detected in the circuit 72), and high when the tone is not present. This signal at B is input to the microphone receiver muting circuitry and controls the muting of conventional audio amplification and output circuits (not shown).

Point A in FIG. 3 is essentially a DC voltage proportional to the amplitude of the tone signal from tone oscillator 20 (FIG. 1). When the resistor 42 of FIG. 2 is switched out by transistor 44, as would be the case of a low battery indication from microcontroller 50, the change in amplitude in the tone from oscillator 20 can be detected at point A. Alternatively, if a resistor is not switched in and out of the output of the tone oscillator, the voltage from battery 12 (FIG. 1) supplies the tone oscillator 20 via DC amplifier 24, producing a gradual drop in the amplitude of the tone form the oscillator 20. This change in voltage can also be detected at point A.

Referring to FIG. 10, the negative terminal (conductor 100) of comparator 106 contains a dc voltage that is proportional to the amplitude level of the tone oscillator. This dc voltage then enters a buffer amplifier stage 41 through R1 and R2. R 1 and R2 are used to divide down the dc level, if desired (i.e., for flexibility). The buffer is used for isolation purposes; it looks like a high impedance, so it will not load down the signal at conductor 100.

The output of buffer amplifier 41 enters a commercially available analog to digital converter 42, for example, a Texas Instrument Device No. TLC549C. Here, the dc level is converted to a digital signal. This digital signal is monitored by the μC which then updates the LCD display accordingly.

An alternate low battery level detection circuit 76 for detecting these changes in tone amplitude is shown in FIG. 4. The detection circuit 76 includes two sections of an LP339 comparator integrated circuit. This circuit 76 consists of resistors 110, 112, and 114 placed in series from a 12 V power supply, which set reference levels for comparison. The voltage signal at threshold T1 is supplied to the positive terminal of LP339 comparator 116. The voltage signal at threshold T2 is supplied to the negative terminal of comparator 118.

The voltage signal from point A (FIG. 3) is supplied to the negative terminal of comparator 116, and the positive terminal of comparator 118. The comparator outputs are combined at point C, and are tied via a pull-up resistor 117 to +5 volts.

Voltage threshold T1 is set such that when the battery 12 is sufficiently low, the tone's amplitude is reduced such that the voltage at point A falls below threshold T1, thus making the voltage at point C go high. This high signal at point C is fed to a suitable low battery indication circuit. Representative examples of such a circuit would be a microcontroller that operates an LED, or LCD display, or other visual or audible indicator, or a suitable alarm or warning circuit.

In order to keep the low battery indication circuit from not coming on when the transmitter 10 is turned off, a second threshold T2 is set such that when the amplitude of the tone at point A falls below T2 (indicating transmitter 10 is OFF), comparator 118 pulls to ground, sending a low signal at point C to the microcontroller, which tells the indication circuit to not activate the indicator. Many comparators could be used to detect more amplitude levels if greater resolution is desired.

Figure 5:
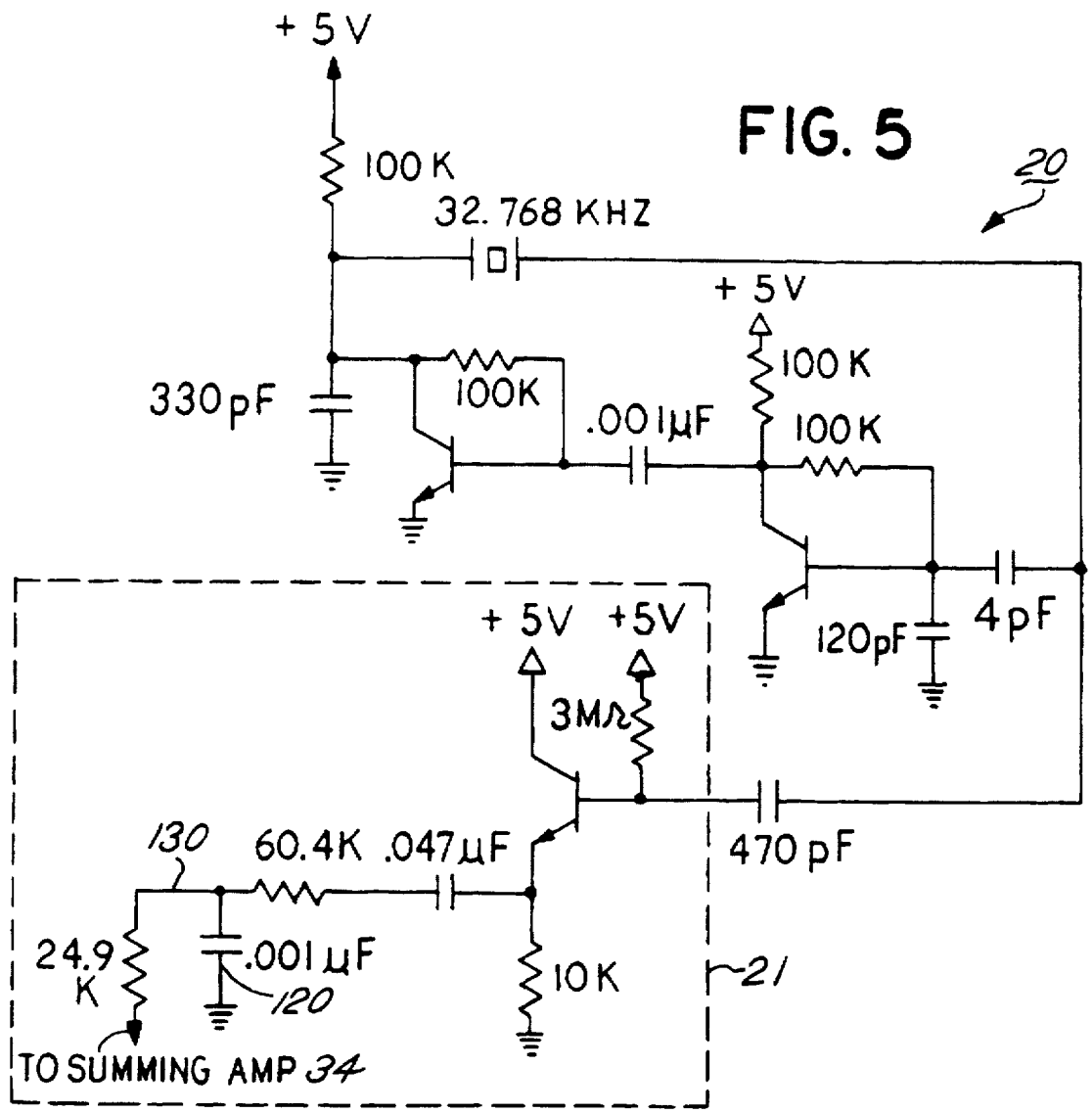
FIG. 5 is a circuit diagram of the tone oscillator circuit of FIG. 1.
Figure 6:
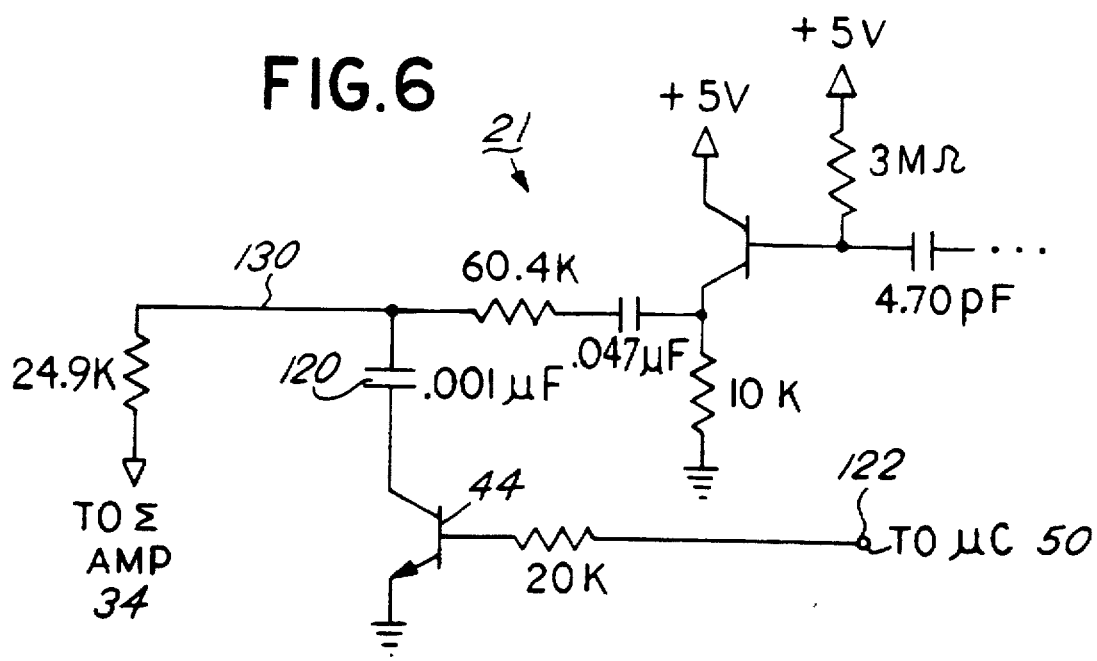
FIG. 6 is a circuit diagram of the buffer/filter portion of the tone oscillator circuit of FIG. 5, showing the first generation circuit for changing the amplitude of the high frequency tone as in the case of a low battery condition.
Figure 7:
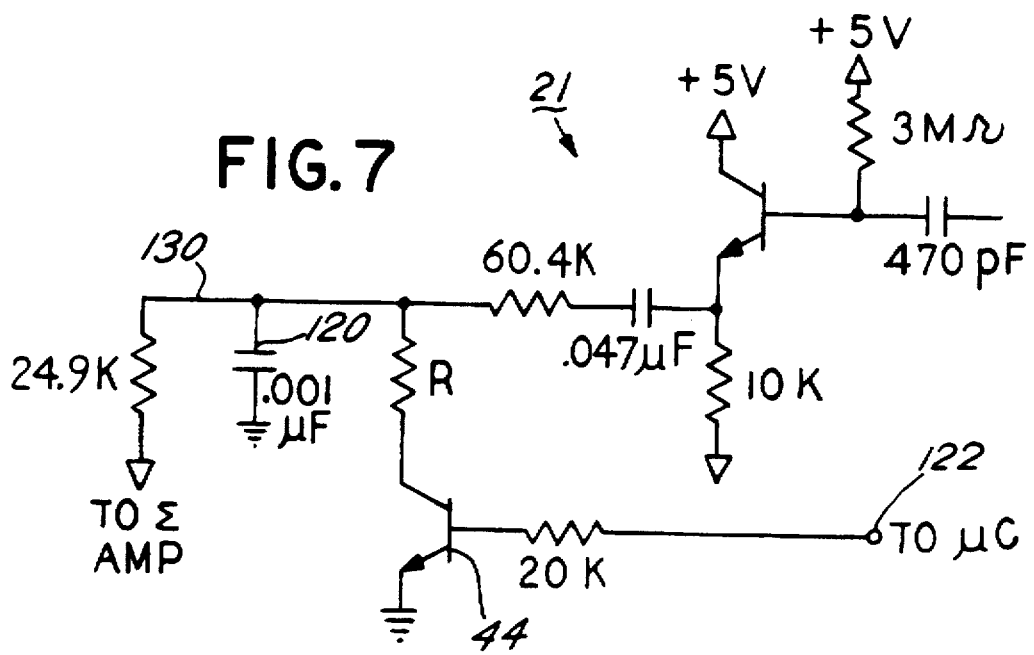
FIG. 7 is a circuit diagram of the buffer/filter portion of the tone oscillator circuit of FIG. 5, showing another alternative circuit for changing the amplitude of the tone.
Figure 9:
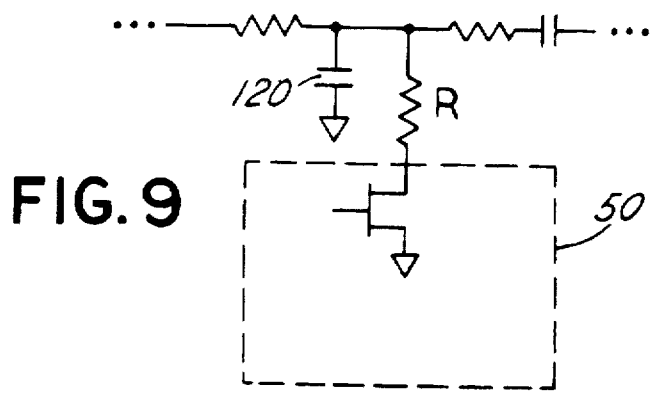
FIG. 9 is a block diagram of an alternative arrangement for the circuit of FIG. 6 and FIG. 7.

Persons of skill in the art will recognize that other methods of changing the amplitude of the tone signal may be made to indicate a low battery condition in the transmitter. For example, FIG. 5 shows the tone oscillator 20 circuit in the transmitter 10. The amplitude of the tone signal passed to the summing amplifier 34 (FIG. 2) may be varied by switching in and out the filter capacitor 120 in the buffer/filter portion 21 of the tone oscillator 20, as shown in FIG. 6. When a logic high signal is placed at point 122 from microcontroller 50, indicating a low battery condition, transistor 44 is switched on, causing tone level to drop at the input to the summing amp 34. An alternative circuit, shown in FIG. 7, has a resistor R in series with transistor 44, placed in parallel with capacitor 120. Another option would be to let the microcontroller 50 pull the resistor R to ground, instead of using the transistor (see FIG. 9), and similarly with the capacitor. In all of these examples, the goal is simply to change (e.g., reduce) the voltage on the output conductor 130 of the tone oscillator 20 when a low battery condition is present. If the alternative circuit of FIG. 6 is used, the capacitor 120 is part of the RC filter, switching it out may result in the second harmonic of the tone signal being present on the input to the summing amplifier 34, which may be undesirable. Hence, the embodiment of FIG. 2 is preferred to FIGS. 6, 7, and 9, because the RC filter effect of capacitor 120 is preserved. Of course, the simplest choice (and, the one that works best) is running the oscillator as shown in FIG. 1.

The switching of the voltage from tone oscillator 20 from high to low to indicate a low battery condition could be reversed with the voltage switching from low to high. The low battery detection circuit 76 would have to be modified to detect the increase in amplitude indicating a low battery condition.

From the foregoing it will be appreciated that further variations in the details of the best mode and alternative embodiments contemplated by the inventor for practicing the invention, described above, may be made without departure from the true scope and spirit of the invention. The choice of particular tone oscillators, tone frequencies, and low battery detection circuits may of course be varied and such variations are within the abilities of persons skilled in the art. Further, alternative circuits that change the amplitude of the tone from the tone oscillator may be readily developed by person of ordinary skill in the art. The true scope of the invention is defined by the appended claims, to be interpreted in light of the foregoing.

What is claimed is:

1. In a wireless communication system comprising a transmitter having a battery and a receiver, a method for determining the status of said battery, comprising the steps of:
   (a) transmitting a tone used for unsquelching the receiver from said transmitter to said receiver, said transmitter tone having a first amplitude associated with said battery being in a normal condition;
   (b) changing the amplitude of said tone from said first amplitude to a second amplitude when the condition of said battery changes from a normal condition to a low battery condition;
   (c) receiving said tone with said receiver;
   (d) detecting said change in amplitude of said tone; and
   (e) responsively alerting a user of said system of the low battery condition of said battery when said amplitude of said tone changes.

2. The method of claim 1, wherein said transmitter comprises a wireless microphone transmitter.

3. The method of claim 2, wherein said tone comprises a tone used for tone coded squelch.

4. The method of claim 3, wherein said tone comprises a sine wave having a frequency above the audible limit of a human.

5. The method of claim 4, wherein said tone comprises a 32.768 Khz sine wave.

6. The method of claim 1, wherein said step of changing the amplitude comprises the step of lowering the amplitude of said tone.

7. The method of claim 1, wherein said tone is generated by a tone oscillator, and wherein said step of changing the amplitude of said tone comprises the step of changing the amplitude of the output signal from said tone oscillator.

8. The method of claim 1, wherein said tone is generated by a crystal oscillator.

9. In a wireless communication system comprising a transmitter and a receiver, apparatus for indicating the status of a transmitter battery, comprising:
   (a) tone generation means in said transmitter for generating a tone used for unsquelching the receiver, said tone having a first amplitude associated with said battery being in a normal condition;
   (b) a circuit in said transmitter for detecting a change in voltage of said battery and responsively causing said tone generation means to change the amplitude of said tone from said first amplitude to a second amplitude when the condition of said battery changes from a normal condition to a low battery condition;

(c) means for transmitting said tone from said transmitter to said receiver;

(d) means in said receiver for receiving said tone;

(e) a low battery detection circuit in said receiver for detecting the change in amplitude of said tone from said first amplitude to said second amplitude and responsively generating a low battery signal; and (f) an indicator responsive to said low battery signal, said indicator indicating the status of said transmitter battery.

10. A wireless microphone system, comprising:

(a) a microphone transmitter comprising
a battery;
a tone oscillator generating a high frequency tone used for unsquelching a receiver;
means for changing the amplitude of said tone from a first amplitude when the voltage level of said battery is in a normal condition to a second amplitude when the voltage level of said battery falls below a predetermined threshold; and
a transmitter for transmitting said tones;

(b) a receiver comprising
a circuit for detecting and amplifying said transmitted tones;
a low battery means for detecting when the amplitude of said tones generated by said oscillator have changed from said first amplitude to said second amplitude, said low battery detection circuit responsively generating a low battery signal; and
means for supplying said low battery signal to an indicator circuit alerting a user of said microphone system of the low battery condition of said transmitter battery.

11. The microphone system of claim 10, wherein said transmitter further comprises a DC—DC converter connected to said battery and supplying a constant voltage to the transmitter, the said tone oscillator being powered by a source which decreases with said battery via a DC amplifier.

12. The microphone system of claim 10, wherein said tone oscillator further comprises an output conductor, and wherein said means for changing the amplitude of said tone including means powering said tone oscillator.

13. The microphone system of claim 10 including:

a microcontroller connected to said battery and responsively issuing an output signal, said output signal comprising a first signal when said battery voltage is above a threshold level and a second signal when said battery voltage drops below said threshold, a transistor receiving said first and second output signals from said microcontroller; and resistance means in circuit with said transistor and said output conductor of said tone oscillator;

whereby said transistor changes the voltage drop across said resistance means in response to said output signal from said microcontroller, causing the output voltage of said tone oscillator on said output conductor to change depending on the condition of said battery.

14. A wireless microphone transmitter, comprising:

a transmitter battery;

an audio circuit receiving sound waves from a sound source and responsively generating an audio signal;

a tone oscillator generating a high frequency tone signal used for unsquelching a receiver; and a summing means for combining said audio signal with said tone signal;

means for changing the amplitude of said tone from a first amplitude when the voltage level of said battery is in a normal condition to a second amplitude when the voltage level of said battery falls below a predetermined threshold; and an RF circuit for transmitting said summed tone signal and said audio signal to a receiver for said microphone transmitter.

15. A wireless microphone receiver for receiving signals from a wireless microphone transmitter having a battery, comprising:

a detection circuit for detecting and amplifying high frequency tones for unsquelching the receiver from said microphone transmitter;

means for detecting when the amplitude of said tones changes from a first amplitude associated with said battery being in a normal condition to a second amplitude when the condition of said battery changes from a normal condition to a low battery condition and for indicating this change via a low battery signal; and means for supplying said low battery signal to an indicator circuit, said indicator circuit activated upon receipt of said low battery signal.

* * * * *

UNITED STATES PATENT AND TRADEMARK OFFICE
CERTIFICATE OF CORRECTION

PATENT NO. : 5,794,125
DATED : August 11, 1998
INVENTOR(S) : Steven M. Grad It is certified that error appears in the above-identified patent and that said Letters Patent is hereby corrected as shown below:

On the title page, item [54] and column 1, line 1, "LIKE" should read --LIFE--.

Signed and Sealed this

Twenty-fourth Day of November,1998

*Attest:*

BRUCE LEHMAN

*Attesting Officer*  Commissioner of Patents and Trademarks